Patented Apr. 6, 1937

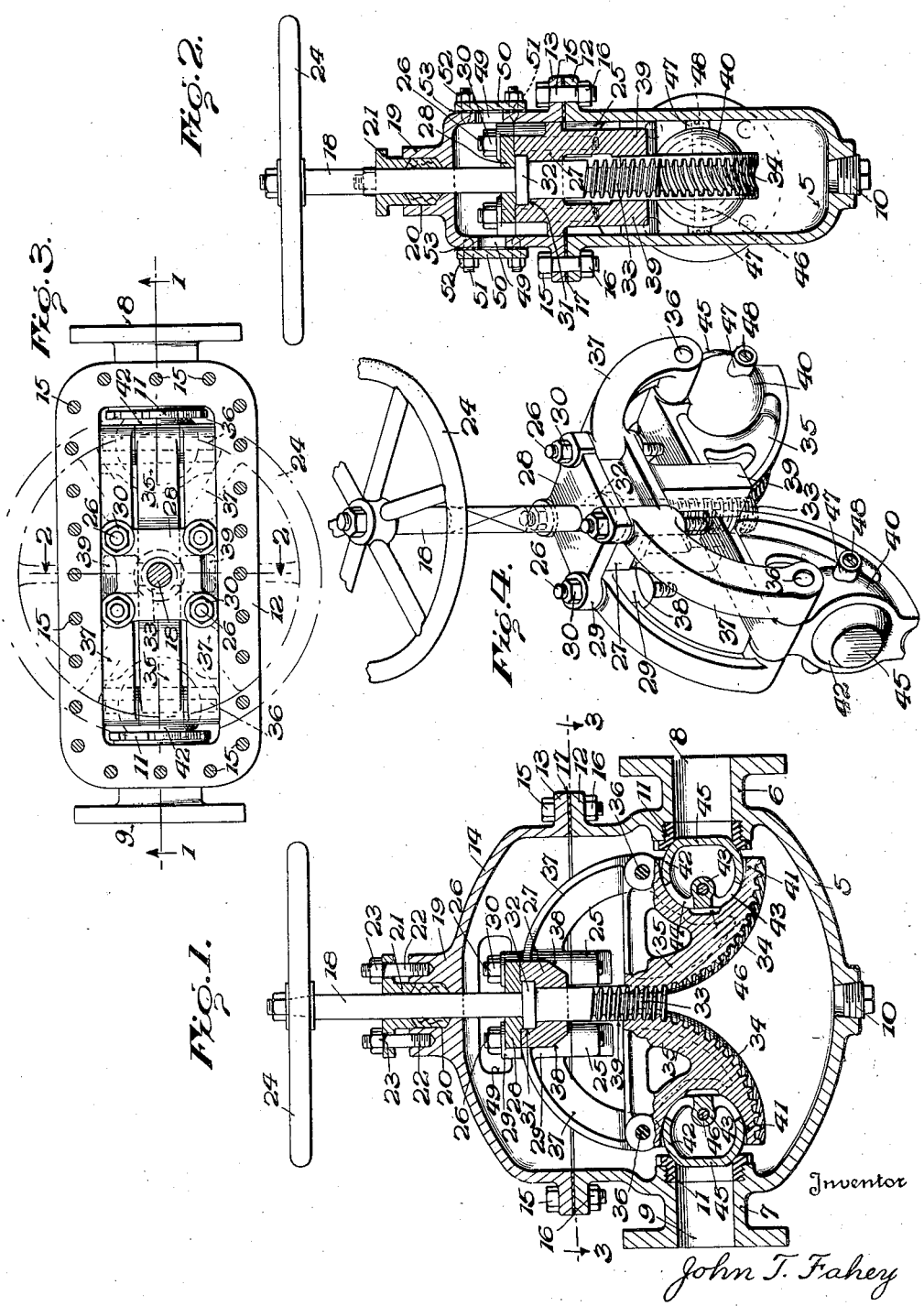

2,076,336

UNITED STATES PATENT OFFICE 2,076,336

VALVE

John T. Fahey, Oil City, Pa.

Application December 19, 1935, Serial No. 55,259

8 Claims. (Cl. 277—33)

This invention relates to valves, and more particularly to valves of the type adapted for use in oil, gas and other fluid pipe lines.

During the course of regular maintenance work on oil, gas and other fluid pipe lines, it often becomes necessary to replace the gaskets between the bodies and bonnets of the valves which are associated with the lines. With most of the types of valves now used, it is necessary to drain and shut off the sections of line on both sides of a valve before the gasket can be replaced because of the fact that, when the valve bonnet is removed, the valve can no longer be held closed against the fluid pressure and the fluid will escape through the open top of the valve body. However, to drain the line each time replacement of a gasket becomes necessary is a wasteful and undesirable procedure.

It is therefore one of the objects of the present invention to provide a new and improved form of valve which is so constructed that the valve may be held or locked in closed position whether or not the bonnet is in place, thereby enabling removal of the bonnet without disturbing the position of the valve elements.

Another object is to provide a valve of this character wherein the majority of the operating parts of the valve may be assembled as a unit exteriorly of the valve body and then mounted in fixed relation to the body independently of the bonnet.

A further object is to provide a valve of novel construction wherein all of the valve operating mechanism is supported by the valve body and in a position well above the bottom of said body so as to avoid the possibility of the valve elements sticking in any particular position due to the freezing of liquid which may gather in the valve body, the deposit of sediment or other foreign matter therein, or other conditions of like nature, and wherein the valve members are so constructed that in open position they lie above the line of flow through the valve body.

Still another object is to provide a valve construction embodying improved means for adjusting the valve members and wherein a tighter seating is obtained with less machining cost due to the provision of valve members which automatically compensate for wear in themselves and in the valve seats, thereby materially decreasing leakage.

A still further object is to provide a valve of the character described which by virtue of its novel construction is more easily assembled and maintained than previously known valves of similar type.

These and other objects will appear more fully upon a consideration of the detailed description of the embodiment of the invention which follows. Although only one specific form of valve has been described and illustrated in the accompanying drawing, it is to be expressly understood that this drawing is for the purpose of illustration only and is not to be construed as defining the scope of the invention, reference being had for this latter purpose to the appended claims.

Referring now to the drawing, wherein like reference characters indicate like parts throughout the several views:

Fig. 1 is a vertical sectional view, with certain parts shown in full, of one form of valve embodying the present invention, the section being taken substantially on line 1—1 of Fig. 3;

Fig. 2 is a vertical sectional view, with certain parts shown in full, of the valve of Fig. 1 taken substantially on line 2—2 of Fig. 3 at right angles to the plane of Fig. 1;

Fig. 3 is a plan view of the valve of Figs. 1 and 2 with the valve bonnet removed; and Fig. 4 is a perspective view of certain of the parts of the valve of Figs. 1–3 with the valve body and bonnet removed.

As shown in the drawing, the valve of the present invention comprises a valve body 5 of any suitable form having laterally projecting coupling bosses 6 and 7, forming fluid inlet and outlet openings 8 and 9 to and from the interior of body 5, and a drain plug 10 preferably located in the lowermost portion of the bottom wall of the valve body. While valve body 5 is shown as being substantially U-shaped in cross section, and relatively wide in the plane of Fig. 1 and relatively narrow in the plane of Fig. 2 at right angles to that of Fig. 1, it will be understood that other forms of valve body may be used without in any way departing from the invention. For example, a cylindrical valve body may be used where it is contemplated that sediment and other foreign matter will be removed from the interior of the body through the top thereof with the bonnet removed, the rest of the valve parts remaining in place.

Valve body 5 is also fitted with removable valve seats 11 which are threaded into the inner ends of bosses 6 and 7 and are beveled to receive in tightly seating relation the valves later to be described. The upper end of valve body 5 is provided with a suitable flange 12 to which the corresponding flange 13 of the valve bonnet 14 is adapted to be removably secured, as by bolts 15 and nuts 16. A gasket 17 is usually provided between flanges 12 and 13. The valve bonnet 14 is apertured centrally of its top to permit the passage therethrough of the upper end of valve stem 18, and is provided with a boss 19 having an enlarged recess to receive the valve stem packing 20, the latter being compressed and held in place by a gland 21 removably secured to boss 19 by studs 22 and nuts 23. The upper end of valve stem 18 may be provided with a suitable hand wheel 24 in the usual manner.

Novel means are provided for supporting valve stem 18 and the associated valve operating elements on valve body 5 in such manner that the valve members may be held or locked in any desired position whether or not valve bonnet 14 is in place, thereby enabling removal of the bonnet for replacement of gasket 17 or cleaning of the interior of body 5 without disturbing the position of the valve members. In the embodiment illustrated, the upper end of valve body 5 is provided with a suitable number of inwardly projecting bosses or lugs 25 formed integrally with or secured to the side wall of said body, which bosses or lugs 25 are in turn provided with vertical threaded openings extending therethrough adapted to receive the lower ends of upwardly extending studs 26. Bosses 25, of which there are four in the embodiment illustrated, serve to support the entire valve assembly with the exception of valve body 5 and bonnet 14 and their associated elements. To this end, a bearing or supporting plate 27 of generally rectangular shape rests on bosses 25 while a thrust plate 28 is supported on top of bearing plate 27. Bearing plate 27 and thrust plate 28 are provided with apertured bosses 29 which are adapted to receive the upper ends of studs 26. Suitable nuts 30 threaded on the ends of studs 26 serve to securely connect bearing plate 27 and thrust plate 28 to one another and to bosses or lugs 25.

Both bearing plate 27 and thrust plate 28 are apertured for passage therethrough of valve stem 18, bearing plate 27 also being provided with an enlarged recess 31 adapted to receive and provide a bearing surface for a shoulder or collar 32 formed on valve stem 18 intermediate its ends. Collar 32 is so located on valve stem 18, and of such height, that when the valve elements are properly assembled it is clamped between bearing plate 27 and thrust plate 28 so as to prevent vertical movement of valve stem 18 relative to said plates.

The lower end of valve stem 18 below collar 32 extends through and downwardly from bearing plate 27 and is threaded as indicated at 33 for engagement with the correspondingly threaded peripheries 34 of a pair of substantially sector shaped valve-carrying members 35. In the embodiment shown, each of valve sectors 35 is in the form of a quadrant and, when the valve is in closed position, lies with one radial edge in a substantial horizontal position and the other radial edge in a vertical position closely adjacent the associated valve seat 11. Each of valve sectors 35 is pivotally mounted on a horizontal pin 36, the latter in turn being carried by the lower ends of a pair of laterally separated, curved arms 37 which are secured to and preferably formed integral with bearing plate 27 and depend downwardly therefrom. The axes of pins 36 pass substantially through the centers of curvature of the arcuate threaded peripheries 34 of valve-carrying sectors 35.

With this construction, it is evident that rotation of valve stem 18, as by manipulation of hand wheel 24, will move valve sectors 35 up and down around pins 36 as pivots so as to carry the normally vertical edges of said sectors away from and toward valve seats 11. It will be noted that pins 36 are located in a plane above that of inlet and outlet openings 8 and 9 so that, when the valve sectors are raised to their uppermost or open valve positions, all of the valve operating mechanism is disposed above the path of flow of the fluid through the valve body 5. The lower end edges of bearing plate 27 may be beveled as indicated at 38 so as to permit valve sectors 35 to be elevated to a position 90° from that shown in the drawing. Bearing plate 27 may also be provided with a pair of members 39 which depend downwardly from the central portion of said plate on either side of the valve stem and serve as guides for the stem and valve sectors.

In order that the valve members may be tight seating without requiring excessive machining thereof and of the valve seats, and may also be automatically adjustable to compensate for wear, the construction of the present invention includes a novel form of spherical surfaced valve and novel means for supporting said valve in valve carrying sector 35. As shown, the portion of each of valve sectors 35 adjacent its normally vertical edge is enlarged to form a substantially hemispherical valve housing 40 the inner surface of which is substantially hemispherical with respect to a plane passing through the axis of pin 36 parallel to the normally vertical edge of sector 35, while the surface between said plane and the plane of said vertical edge is substantially cylindrical as indicated at 41 (see Fig. 1) to permit the automatic adjusting movement of the valve next to be described.

Each of the valves consists of a hollow, substantially spherical member 42, of slightly less diameter than the inner surface of valve housing 40, having a horizontally extending boss 43 projecting inwardly from the central portion of the wall of said member disposed within housing 40 and suitable elongated openings 44 above and below said boss to facilitate manufacture and assembly of the valve. The portion of valve member 42 which normally lies within the bore of valve seat 11 may be flattened as indicated at 45. Each of valve members 42 is pivotally mounted within its housing 40 on a pin 46 which passes through boss 43 and is supported at its ends in suitable bearing bosses 47 formed integrally with and extending outwardly from the hemispherical wall of housing 40. The outer ends of bearing bosses 47 may be threaded, if desired, so as to receive suitable locking plugs or screws 48, as shown in Fig. 4. It will be noted that the axis of pin 46 about which valve member 42 pivots, while in the same horizontal plane as the centers of curvature of the inner surface of housing 40 and the outer surface of valve member 42, is offset inwardly with respect to said centers, thus providing an eccentric mounting for the valve member so as to permit it to automatically adjust its position relatively to valve carrying sector 35 and valve seat 11 to compensate for wear either of the surface of the valve member itself or of the beveled surface of valve seat 11.

In assembling the valve of the present invention, the valve members 42 may be properly mounted in valve carrying sectors 35, sectors 35 may be mounted on pins 36 in supported relation to bearing plate 27 and arms 37, and valve stem 18 may be passed through the bearing plate and brought into threaded engagement with sectors 35 and the latter elevated to their uppermost positions, all prior to the time that the said parts are mounted within valve body 5. The thus assembled unit may then be placed within valve body 5 and lowered over studs 26 until bearing plate 27 rests on bosses or lugs 25. Thrust plate 28 is next dropped down around valve stem 18 and over studs 26, and nuts 30 are threaded onto the upper ends of said studs so as to clamp collar 32 between the thrust plate and the bearing plate. Gasket 17 and valve bonnet 14 may then be secured to valve body 5 in the usual manner, after which the space between valve stem 18 and bonnet boss 19 is sealed by packing 20 and gland 21. Assembly of the entire valve structure is completed by connecting hand wheel 24 to the upper end of valve stem 18.

In order that the valve elements may be adjusted without removing valve bonnet 14, the latter may be provided with a suitable hand hole 49 on each side thereof adjacent nuts 30, which hand holes are normally covered by plates 50 secured to bonnet 14 in any suitable manner, as by studs 51 and nuts 52. A suitable gasket 53 may also be provided between each cover plate 50 and the wall of bonnet 14.

There is thus provided by the present invention a new and improved form of valve which is especially well adapted for use in oil and gas pipe lines where the prevention of leakage, particularly during maintenance work on the line, is a matter of prime importance. The valve of the present invention is so constructed that the bonnet may be removed without disturbing the positions of the operating elements of the valve, thereby making it possible to replace the packing and gaskets of the valve bonnet, and to even entirely remove the bonnet and clean the interior of the valve, without shutting off and draining the sections of line on both sides of the valve. The valve elements themselves are of such novel construction as to be readily adjustable and to automatically compensate for wear of either the valves or valve seats. Inasmuch as all of the operating parts of the valve are supported by the valve body and in positions above the normal path of flow of fluid through the valve, it will be seen that freezing or sticking of the valve elements is effectively prevented. Moreover, by housing the valve members within valve sectors which are in turn supported by the bearing plate rather than the valve body, it is possible to assemble the majority of the operating parts of the valve as a unit exteriorly of the valve body, thereby materially simplifying manufacture and maintenance of the valve.

Although only one specific form of valve has been described and illustrated in the drawing, it will be obvious that the invention is not limited to the particular construction shown but is capable of a variety of mechanical embodiments. For example, as previously pointed out, the valve body may be of various shapes other than that illustrated, particularly when easier access is desired to the portion of the valve body below the valve operating mechanism. Likewise, it is apparent that the inlet and outlet openings of the valve body need not be diametrically opposite one another nor need they be limited to two as shown, since the valve mechanism of the invention is equally well adapted to valves in which the inlet and outlet lines are angularly disposed to one another or where there are more than two of such lines. It will also be obvious that the sector-supporting arms may be of any suitable construction other than that specifically illustrated.

Various other changes, which will now become apparent to those skilled in the art, may be made in the form, details of construction and arrangement of the parts without departing from the spirit of the invention. Reference is therefore to be had to the appended claims for a definition of the limits of the invention.

What is claimed is:

1. In a valve structure, the combination of a valve body having a plurality of fluid inlet and outlet openings formed therein, valve seats for said openings, a valve for each of said openings, a collared valve stem operatively connected to said valves and extending upwardly out of said valve body, a bearing plate mounted on and removably secured to said body, said plate being apertured for passage therethrough of said valve stem and having a bearing surface on which the collar of said stem is supported, a thrust plate removably secured to said bearing plate and locking said collar against upward movement, means carried by said bearing plate for supporting said valves in positions adjacent said valve seats for movement toward and away therefrom upon actuation of said valve stem, and a valve bonnet removably secured to said valve body, said bonnet being apertured to permit the passage therethrough of said valve stem and being removable from said valve body without affecting the positions of said valves or the connection between said thrust plate, bearing plate and valve body.

2. In a valve structure, the combination of a valve body having a plurality of fluid inlet and outlet openings formed therein, valve seats for said openings, a valve for each of said openings, a collared valve stem operatively connected to said valves and extending upwardly out of said valve body, a bearing plate mounted on and removably secured to said body adjacent the top thereof, said plate being apertured for passage therethrough of said valve stem and having a bearing surface on which the collar of said stem is supported, a thrust plate removably secured to said bearing plate and locking said collar against upward movement, downwardly depending members carried by said bearing plate having means for supporting said valves in positions adjacent said valve seats for movement toward and away therefrom upon actuation of said valve stem, and a valve bonnet removably secured to said valve body, said bonnet being apertured to permit the passage therethrough of said valve stem and being removable from said valve body without affecting the positions of said valves or the connection between said thrust plate, bearing plate and valve body.

3. In a valve structure, the combination of a valve body having a plurality of fluid inlet and outlet openings formed therein, valve seats for said openings, a valve for each of said openings, a collared valve stem operatively connected to said valves and extending upwardly out of said valve body, a bearing plate mounted on and removably secured to said body adjacent the top thereof, said plate being apertured for passage therethrough of said valve stem and having a bearing surface on which the collar of said stem is supported, a thrust plate removably secured to said bearing plate and locking said collar against upward movement, a plurality of downwardly depending arms carried by said bearing plate, the lower ends of said arms supporting said valves in positions adjacent said valve seats for movement toward and away therefrom upon actuation of said valve stem, and a valve bonnet removably secured to said valve body, said bonnet being apertured to permit the passage therethrough of said valve stem and being removable from said valve body without affecting the positions of said valves or the connection between said thrust plate, bearing plate and valve body.

4. In a valve structure, the combination of a valve body having a plurality of fluid inlet and outlet openings formed therein, valve seats for said openings, a sector shaped valve-carrying member pivotally supported within said valve body adjacent each of said valve seats, the axis of pivotal support of each of said members passing through the center of curvature of its curved periphery and said periphery being provided with gear teeth, a threaded valve stem engaging the teeth of said members and extending upwardly out of said valve body, and a valve pivotally mounted adjacent one of the radial edges of each of said valve-carrying members in such manner as to be self-adjusting in its position relative to its associated valve seat to compensate for wear.

5. In a valve structure, the combination of a valve body having a plurality of fluid inlet and outlet openings formed therein, valve seats for said openings, a sector shaped valve-carrying member pivotally supported within said valve body adjacent each of said valve seats, the axis of pivotal support of each of said members passing through the center of curvature of its curved periphery and said periphery being provided with gear teeth, a threaded valve stem engaging the teeth of said members and extending upwardly out of said valve body, and a valve pivotally mounted on each of said valve-carrying members, the seat-engaging surfaces of said valves being substantially spherical so as to render said valves self-adjusting with respect to their associated valve seats to compensate for wear.

6. In a valve structure, the combination of a valve body having a plurality of fluid inlet and outlet openings formed therein, valve seats for said openings, a bearing plate mounted on and removably secured to said body, a valve-carrying member pivotally supported by said bearing plate adjacent each of said valve seats, a valve pivotally mounted on each of said members in such manner as to be self-adjusting in its position relative to its associated valve seat to compensate for wear, a collared valve stem operatively connected to said valve-carrying members and extending upwardly out of said valve body, said bearing plate being apertured for passage therethrough of said valve stem and having a bearing surface on which the collar of said stem is supported, a thrust plate removably secured to said bearing plate and locking said collar against upward movement, and a valve bonnet removably secured to said valve body, said bonnet being apertured to permit the passage therethrough of said valve stem and being removable from said valve body without affecting the positions of said valves or the connection between said thrust plate, bearing plate and valve body.

7. In a valve structure, the combination of a valve body having a plurality of fluid inlet and outlet openings formed therein, valve seats for said openings, a bearing plate mounted on and removably secured to said body adjacent the top thereof, downwardly depending members carried by said bearing plate, valve-carrying members pivotally supported by said downwardly depending members adjacent said valve seats, a valve having a spherical seat-engaging surface pivotally mounted on each of said members in such manner as to be self-adjusting in its position relative to its associated valve seat to compensate for wear, a collared valve stem operatively connected to said valve-carrying members and extending upwardly out of said valve body, said bearing plate being apertured for passage therethrough of said valve stem and having a bearing surface on which the collar of said stem is supported, a thrust plate removably secured to said bearing plate and locking said collar against upward movement, and a valve bonnet removably secured to said valve body, said bonnet being apertured to permit the passage therethrough of said valve stem and being removable from said valve body without affecting the positions of said valves or the connection between said thrust plate, bearing plate and valve body.

8. In a valve structure, the combination of a valve body having a plurality of fluid inlet and outlet openings formed therein, valve seats for said openings, a bearing plate mounted on and removably secured to said body adjacent the top thereof, a plurality of downwardly depending arms carried by said bearing plate, sector shaped valve-carrying members pivotally supported in the lower ends of said arms adjacent said valve seats, the axis of pivotal support of each of said members passing through the center of curvature of its curved periphery and said periphery being provided with gear teeth, a valve having a spherical seat-engaging surface pivotally mounted adjacent one of the radial edges of each of said members in such a manner as to be self-adjusting in its position relative to its associated valve seat to compensate for wear, a threaded valve stem engaging the teeth of said valve-carrying members and extending upwardly out of said valve body, a collar formed on said valve stem, said bearing plate being apertured for passage therethrough of said valve stem and having a bearing surface on which said collar is supported, a thrust plate removably secured to said bearing plate and locking said collar against upward movement, and a valve bonnet removably secured to said valve body, said bonnet being apertured to permit the passage therethrough of said valve stem and being removable from said valve body without affecting the positions of said valves or the connection between said thrust plate, bearing plate and valve body.

JOHN T. FAHEY.